United States Patent [19]

Torrey

[11] Patent Number: 5,386,497
[45] Date of Patent: Jan. 31, 1995

[54] ELECTRONIC NEURON SIMULATION WITH MORE ACCURATE FUNCTIONS

[76] Inventor: Stephen A. Torrey, 80 Royalwood Ct., Cheshire, Conn. 06410

[21] Appl. No.: 931,778

[22] Filed: Aug. 18, 1992

[51] Int. Cl.$^6$ .............................................. G06F 15/18
[52] U.S. Cl. ........................................ 395/27; 395/24
[58] Field of Search ..................................... 395/24, 27

[56] References Cited

U.S. PATENT DOCUMENTS

| | | | |
|---|---|---|---|
| 3,103,648 | 9/1963 | Hartmanis | 340/172.5 |
| 3,211,832 | 10/1965 | Putzrath | 395/24 |
| 3,250,918 | 5/1966 | McGrogon | 395/24 |
| 3,273,125 | 9/1966 | Jakowatz | 340/172.5 |
| 4,518,866 | 5/1985 | Clymer | 395/27 |
| 4,773,024 | 9/1988 | Faggin et al. | 395/20 |
| 4,802,103 | 1/1989 | Faggin et al. | 395/24 |
| 4,896,053 | 1/1990 | Kesselring | 395/24 |
| 4,926,064 | 5/1990 | Topang | 395/24 |
| 5,222,195 | 6/1993 | Alkon et al. | 395/27 |

OTHER PUBLICATIONS

DeYong et al, "The Design, Fabrication, and Test of New VLSI Hybrid Analog-Digital Neural Processing Element", IEEE Transactions on Neural Networks, vol. 3, No. 3 pp. 363–374, May 1992.

Primary Examiner—Allen R. MacDonald
Assistant Examiner—Stuart B. Shapiro
Attorney, Agent, or Firm—Parmelee, Bollinger & Bramblett

[57] ABSTRACT

Electronic circuitry in the form of input and output circuits simulate the functions of neurons of most conceivable types. The input circuit has a signal regulating circuit which automatically reduces or increases its output amplitude, based on prior experience, simulating reverberation and memory neurons, respectively. An output stage has an integrator and a threshold circuit with a possible plurality of different types of inputs applied thereto for generating an output which simulates the responsiveness of a neuron. Different combinations of input and output circuits are used to simulate different types of neurons which can then be assembled into neural networks.

7 Claims, 9 Drawing Sheets

INPUT

REGULATED VOLTAGE

CONDITIONAL INPUT

TO OUTPUT STAGE

ELECTRONIC NEURON SIMULATION WITH MORE ACCURATE FUNCTIONS

BACKGROUND OF THE INVENTION

This invention relates to artificial neurons, that is, devices which simulate the function of biological nerve cells. More particularly, this invention describes electronic circuitry arranged to reproduce typical functions of different types of neurons. The simulation translates the functional structure of biological nerve cells from modern neuroscience into electronics.

There has been considerable prior activity in attempting to develop simulations for the actions of neurons as they interrelate in nervous systems or "networks". Individual neurons can be represented schematically as shown in FIGS. 1 and 2. Networks are made up of great numbers of interconnected neurons with the points of connection being referred to as synapses. Each synapse involves the connection of one neuron sending a signal and one neuron receiving the signal. The neuron cell body is referred to as the soma. This serves to integrate all stimulation received from its synapses and respond with an output signal only if a certain threshold is exceeded. Prior attempts to replicate the functions of individual neurons have been rudimentary and have produced results quite remote from realistic simulation of actual nerve cells.

There has been substantial prior work devoted to simulating neuron networks. One development in that field has been the so-called "modifiable synapse". In such a device the degree of stimulation sensed by the receiving neuron at a given time due to input activity at the synapse has been adjusted according to previous activity or some interpretation thereof. Modifying the sensitivities of such synapses is intended to supply memory and adaptiveness in these systems. The neurons are "trained" within the network either manually or automatically, based on the total system's response to stimulation, in order to achieve the desired system responses as consistently as possible. In this way, networks have been able to achieve some degree of pattern recognition with respect to groups of input signals applied to the system. Specific tuning of each neuron's memory based on desired total system response, however, tends to leave the system capable of recognizing only a small group of input patterns. Such intentional "training" of the neurons does not occur in biological systems, and thus is basically not appropriate in a simulated system.

Most prior work on neuron simulation includes some degree of stimulus integration, however, the arrangements are simple and do not allow for a multitude of neuron types which are known to occur in biological systems. Other aspects of nerve cell function are similarly neglected in the prior work. Recreation of the valuable functions of neurons requires an accurate electronic simulation which has not been accomplished in previous designs.

SUMMARY OF THE INVENTION

In accordance with one aspect of a preferred embodiment of the present invention, the neuron design comprises a completely autonomous memory function within each individual synapse including bidirectional change. Synaptic "memory" is represented by variable sensitivity of that synapse to input signals. The sensitivity of the synapse is driven to change automatically with repeated stimulus but also tends simultaneously to revert based on an internal clock whose pace is a direct function of that same level of sensitivity. Sensitivity is controlled at each moment by a stored number at each synapse which is determined by the competition between incoming signals counting up and clock signals counting down. The neuron's memory at each synapse therefore finds its own balance point dependent solely upon its own local experience as occurs in biological systems. This approach maximizes both experience storage capacity and versatility within a neuron network.

In accordance with another aspect of the preferred embodiment, there are two distinct categories of neuron models whose synapses will adapt in opposite directions based on input signal frequency. Since each synapse adjusts autonomously rather than being based on the value of the system's collective response, there is a required predetermination of which way each synapse memory adjusts. One category referred to as "Memory Neurons" will increase sensitivity with increased input frequency. The other category is referred to as "Reverberation Neurons" which will decrease sensitivity. It is considered that all synapses of a single neuron adapt in similar fashion.

In a preferred arrangement, an artificial neuron is comprised of one or any greater number of input stages transmitting, when activated, to a single output stage. The input stage(s) incorporate primarily the synaptic memory function and the output stage provides functions corresponding primarily to the body of the nerve cell. Separate circuits for input and output stages are included. There are minor variations of the input and output circuits to accomplish different desired functions and these differences define different types of artificial neurons.

In accordance with another aspect of the preferred embodiment, each synapse or input stage is assigned a specification concerning its relative "weight" as well as inhibitory versus excitatory status. The "weight" of the synapse is defined by the range of strength of its signal transmission to the output stage. This range is a fixed feature for the synapse. Components within the input stage circuit define the voltage range from which the magnitude of signal transmission is selected by various states of synaptic memory. Synapses assigned excitatory status, when activated, will transmit stimulation to the output stage driving it towards threshold and inhibitory synapses will impair any trend towards threshold.

In accordance with another aspect of the preferred embodiment, each input stage incorporates a potential feature designed to simulate "pre-synaptic inhibition", a variation occasionally noted in biological systems. This is designated as a "conditional" input. If desired, this would reduce the activation of a synapse by the input signal if a second input were simultaneously active.

In accordance with another aspect of the preferred embodiment, the output stage is capable of receiving and integrating multiple simultaneous signals transmitted from the input stage(s) and recovering from such stimulation with a pre-determined vigor. The output stage sensitivity and recovery are individually determined by certain fixed component values within the circuit.

In accordance with another aspect of the preferred embodiment, the output stage may be configured to recover following achievement of threshold in one of two fashions. A possible "resetting" feature is designated to simulate neurons in which the development of an output pulse briefly erases the effects of all existing input stimulation on that neuron's output stage. Lack of "resetting" causes the neuron not to interrupt that level of stimulation and thereby enhance output responsiveness.

In the preferred arrangement, there will be an indefinite number of neuron classes, each specified by the number of input stages feeding to the output stage and whether each input provides excitatory or inhibitory signal transmission. These are fixed features defining the neuron class and would not be expected to change once the neuron is functioning within the system. For example, a class of neuron could be identified by a designation such as E6/I2 which specifies a 6-excitatory and 2-inhibitory input stage configuration. Further subclasses of artificial neurons could be identified with specific weights assigned to each input stage as well as output stage sensitivity, recovery, and resetting specifications.

In carrying out this invention in one illustrative embodiment thereof, an artificial neuron design for simulating the functions of biological nerve cells is provided having a plurality of inhibitory and excitatory inputs which are applied through their respective input stages with regulatory circuits, each having an output then applied collectively to an output circuit. Means are provided for increasing and decreasing the regulatory output based only on the stimuli applied to each excitatory or inhibitory input stage. These stimuli are integrated in a single output stage. A threshold means is provided in the output circuit for generating an output when the accumulated stimuli reach a predetermined level. A conditional input on each input stage and resetting feature on the output stage are also shown.

DESCRIPTION OF PREFERRED EMBODIMENTS

Figure 1:
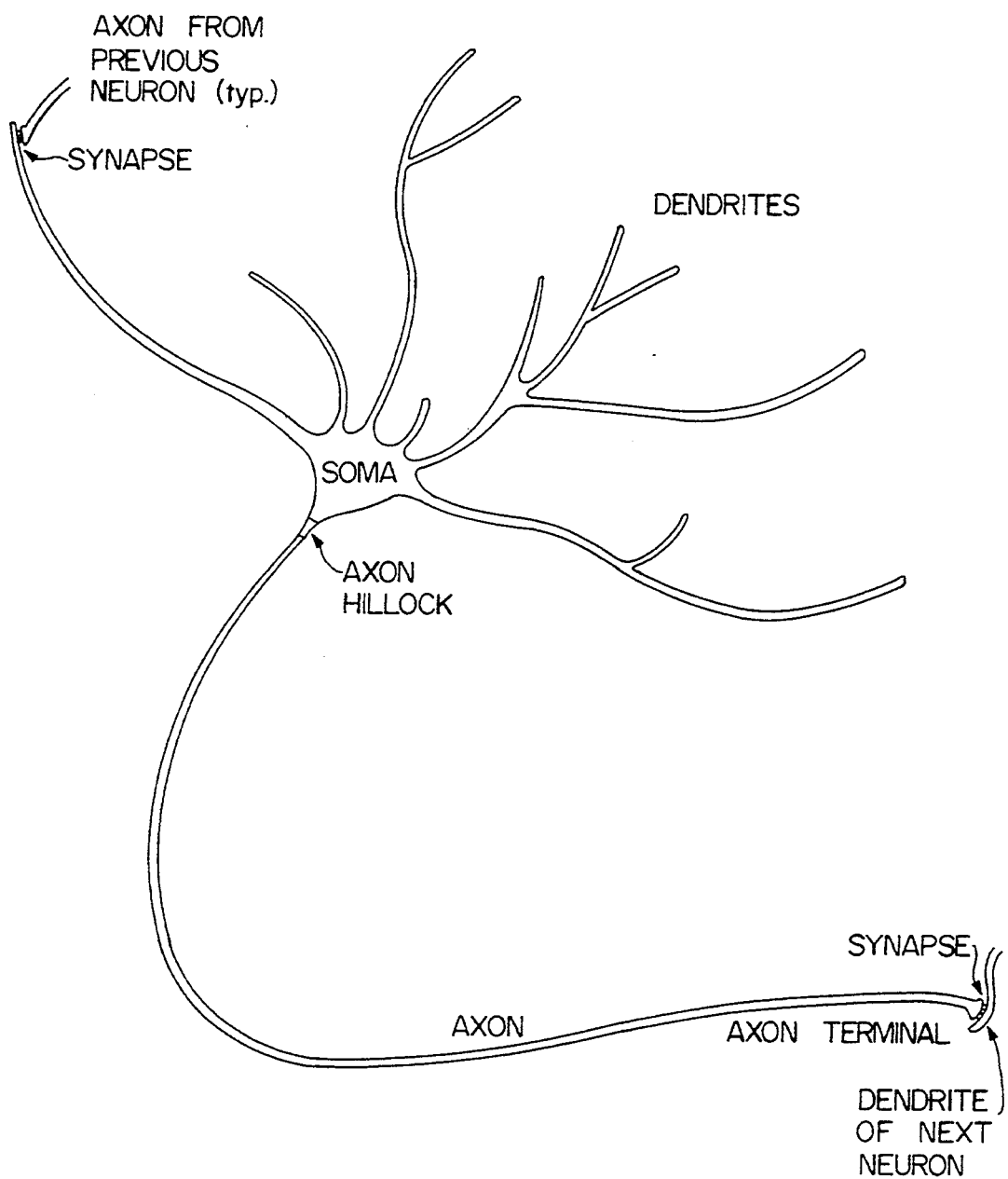
FIG. 1 is a representation of a biological neuron.
Figure 2:
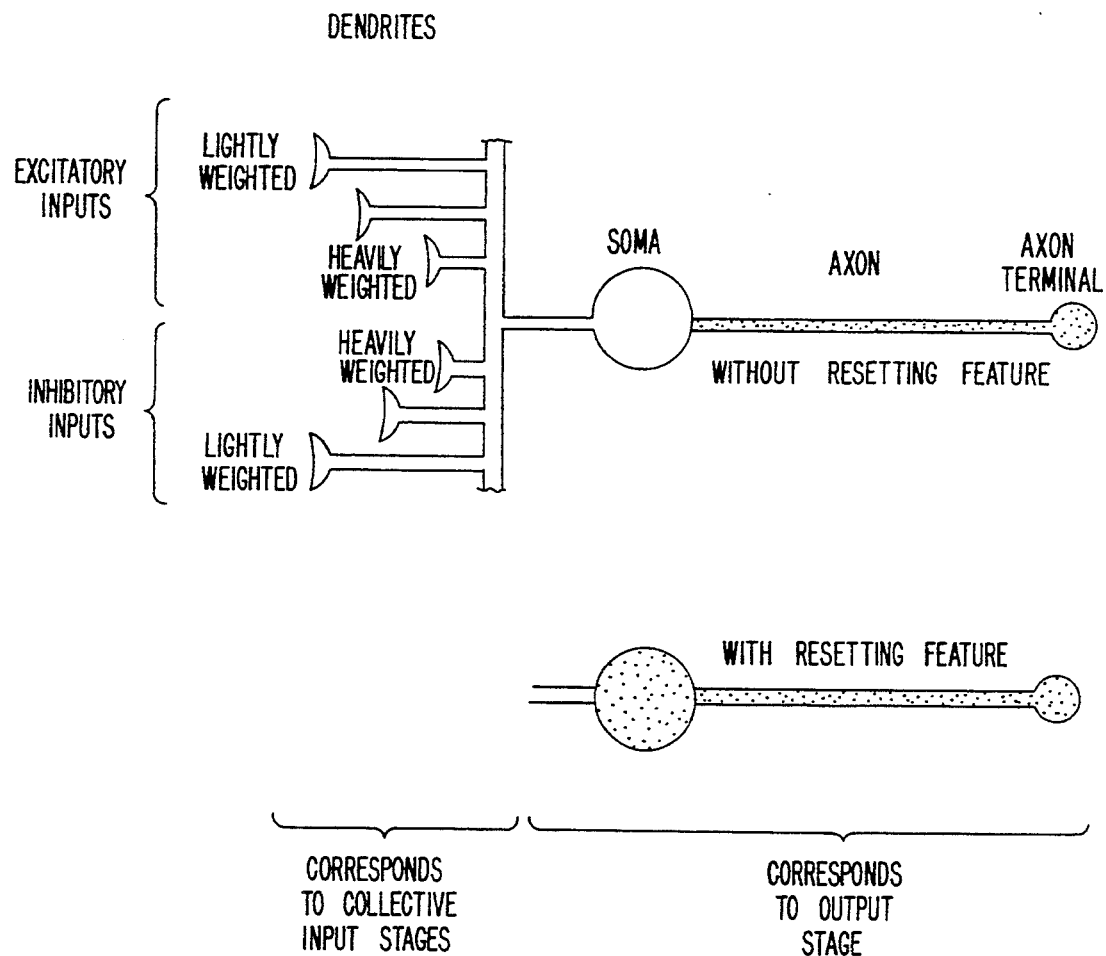
FIG. 2 is a typical schematic diagram of a neuron illustrating its characteristics.
Figure 3:
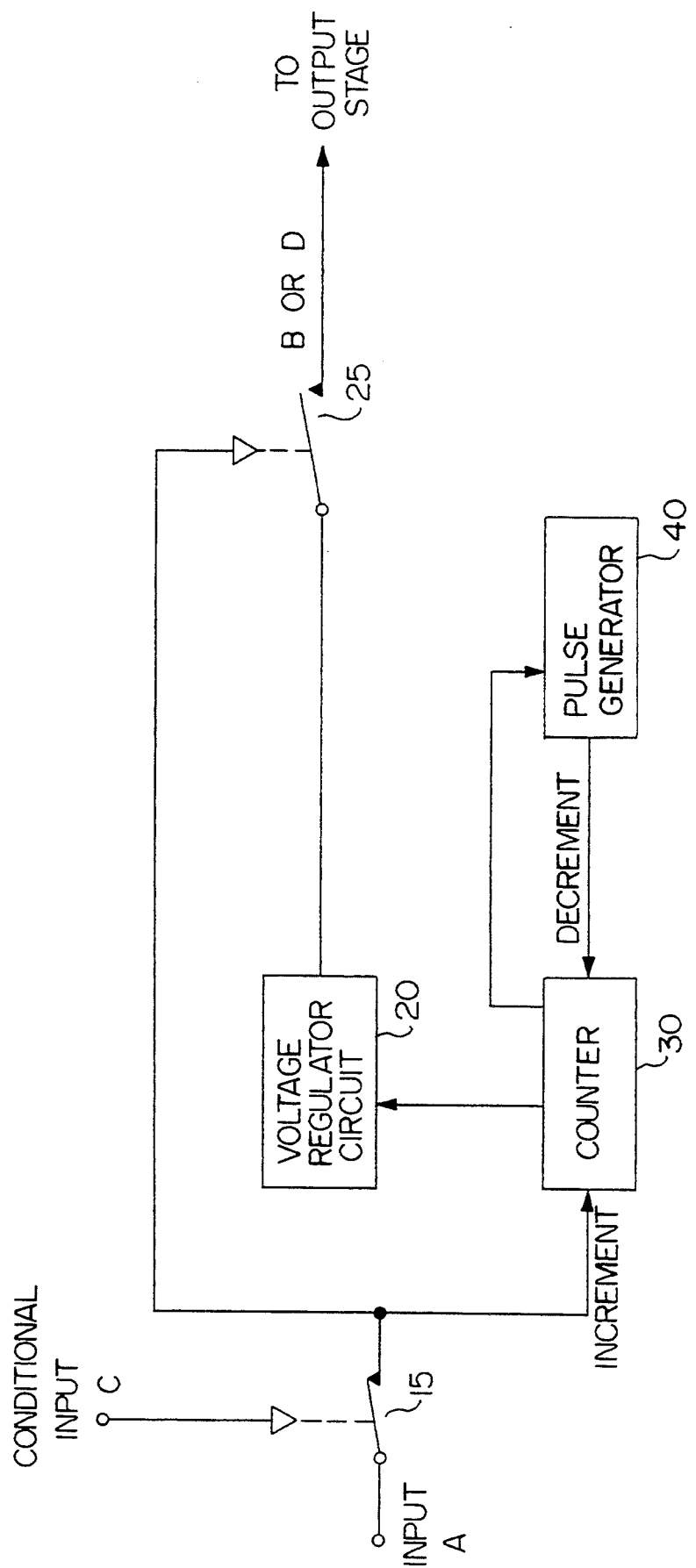
FIG. 3 is a functional block diagram of an artificial neuron's input stage.
Figure 4A:
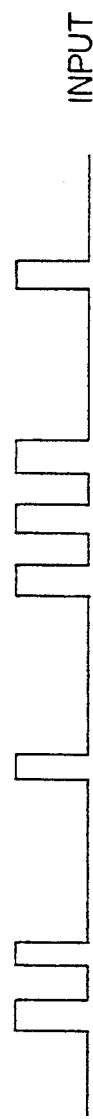
FIGS. 4 A-D show waveforms at certain locations within the input stage.
Figure 4B:
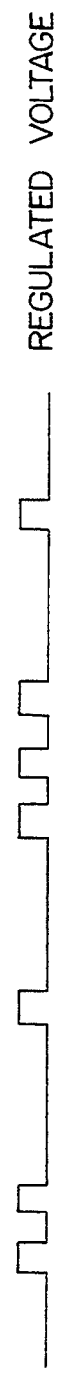
Figure 4C:
Figure 4D:

Referring first to FIG. 3, the input stage depicted includes a voltage regulator circuit 20, the output of which is released via switch 25 by application of an input signal A from a signal source. The input signal is a sequence of pulses, as shown in FIG. 4, having constant time durations and voltage amplitude. The time between pulses in the input signal is variable and identifies the nature of the signal. The input stage in FIG. 3 includes a counter 30 which also receives input signal A. The number stored in the counter increments with each input pulse. This count number directly controls the pulse generator 40 by causing it to generate a pulse frequency proportional to the count number. Pulses from the pulse generator 40 feed back to counter 30 and cause the number stored to decrement. Therefore, when the counter is in a steady state, the number stored represents a balance between input signal A's frequency and pulse generator's frequency. To be more specific, the number stored represents the past history of input signal A in terms of how often it has been activated over time. The same count number controls the voltage regulator circuit 20's output voltage.

A signal emerges from regulator 20 via switch 25 only when signal A is applied and is referred to as signal B. As shown in FIG. 4, signal B has pulses that are concurrent with the pulses of signal A, the same pulse durations and frequencies, but reduced in amplitude. The range of this voltage amplitude variability specifies the "weighting" of the synapse and is determined by fixed components within the regulator 20 as well as counter 30. The actual amplitude of signal B then subsequently depends on the state of counter 30. In a "Memory" neuron, a high count number would cause high amplitude pulses to emerge from regulator 20 and a lower count number would cause proportionally lower amplitude pulses to emerge. In a "Reverberation" neuron, the relationship would be inversely proportional.

The input signals received by the input stage circuit are required to pass through switch 15 (FIG. 3) which would be normally closed but opened if an optional "conditional" input C became active. The signal to be passed to the output stage might contain pulses of shortened duration due to the effects of input C. Signal D (FIG. 4) shows the effect of the conditional input on the final signal (signal B transformed to signal D). This concludes the input stage.

Figure 5:
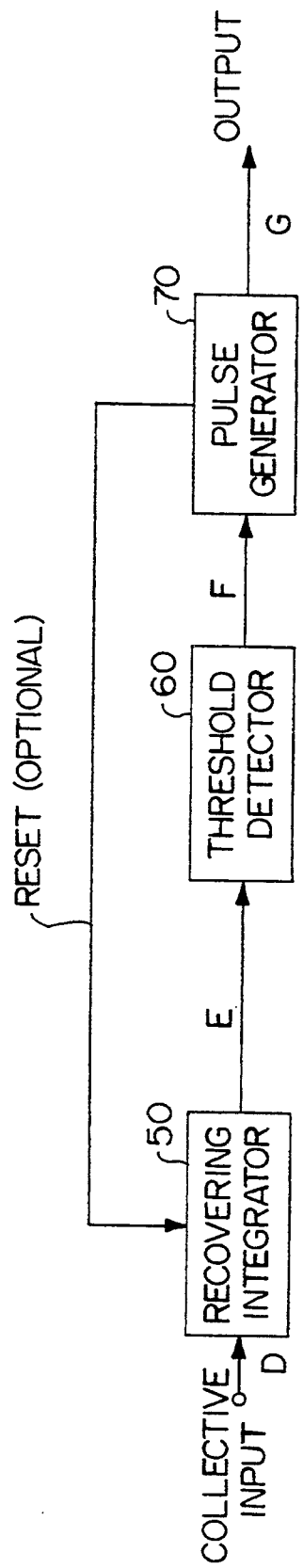
FIG. 5 is a functional block diagram of an artificial neuron's output stage.
Figure 6:
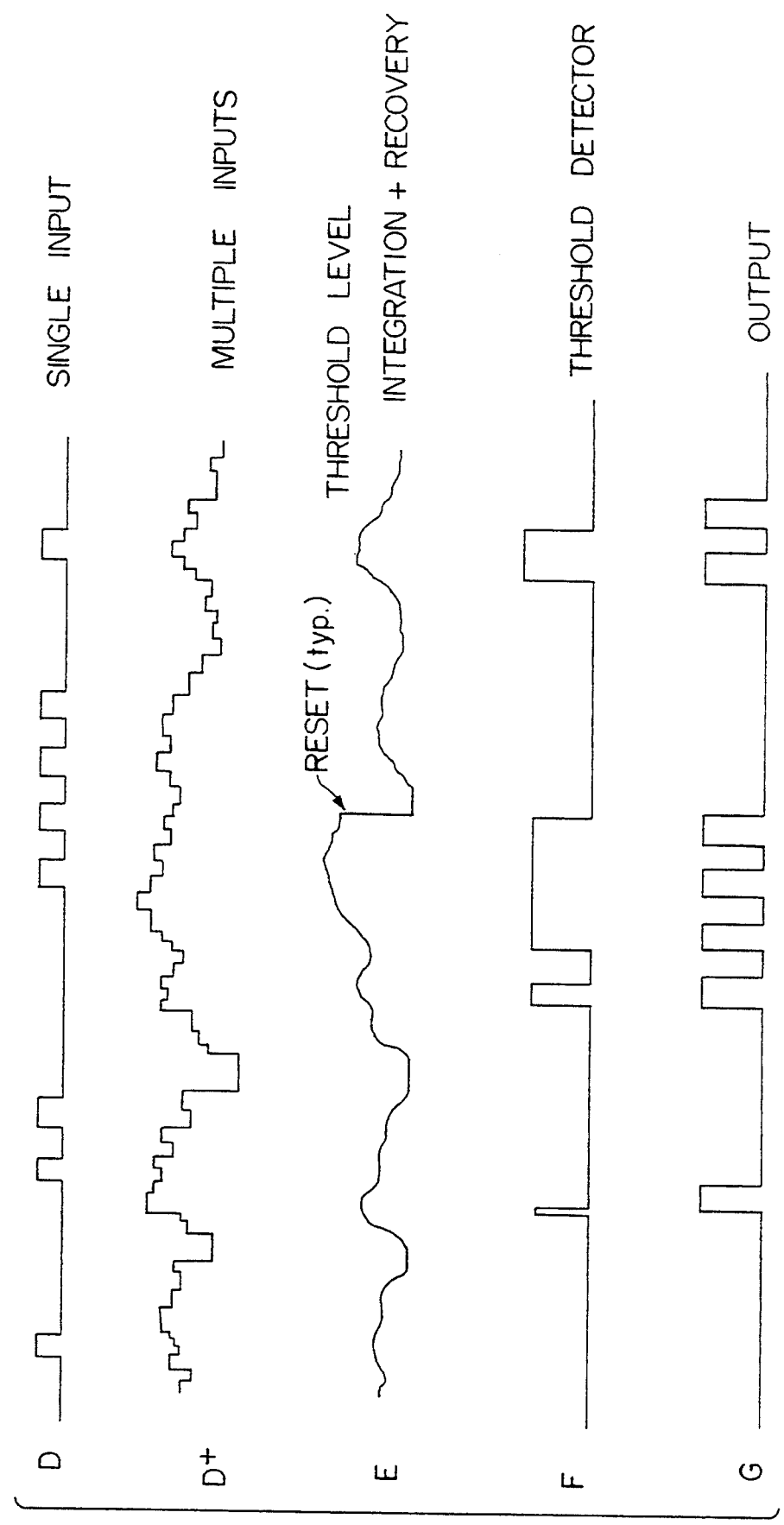
FIG. 6 shows waveforms at certain locations within the output stage.

Referring next to FIG. 5, the output stage depicted includes a recovering integrator 50 which receives signal D from the input stage. Since there can be multiple input stages connecting to a single output stage in a fully constructed artificial neuron, integrator 50 might actually be receiving multiple signals D simultaneously. FIG. 6 shows the summation of multiple signals D as the waveform D+. The integrator accumulates (integrates) voltage as a result of these incoming signals but is also continuously trying to recover back towards baseline. The strength of this recovery tendency as well as the sensitivity of the integrator to incoming stimulation are determined by components within the integrator and define some of the qualities of the neuron in question. A typical voltage waveform from integrator 50 is shown in FIG. 6 as waveform E.

A threshold detector 60 shown in FIG. 5 receives the signal from the recovering integrator 50 and is configured to turn on whenever a predetermined voltage level is surpassed, otherwise is off. Waveform F in FIG. 6 shows a typical threshold detector 60 activity. This signal is sent to a triggerable pulse generator 70 (FIG. 5). When the threshold detector 60 is activated, the pulse generator 70 responds with a pulse or stream of pulses as long as the threshold detector 60 remains on. These pulses shown as waveform G (FIG. 6) are of fixed duration and amplitude, the same as input signal A.

Optionally, there is a resetting connection between triggerable pulse generator 70 and recovering integrator 50 which functions to reset the integrator 50 whenever an output pulse is generated. The effects of this on waveform E are shown in FIG. 6. This would limit the durations of threshold detector 60 activation.

An illustrative example of one form of circuitry which may be used for the input stage, illustrated in block diagram form in FIG. 3 for a reverberant type of neuron, is shown in FIG. 7. An illustrative example of circuitry used for the output circuit in FIG. 5 having a reset capability is shown in FIG. 8.

Figure 7A:
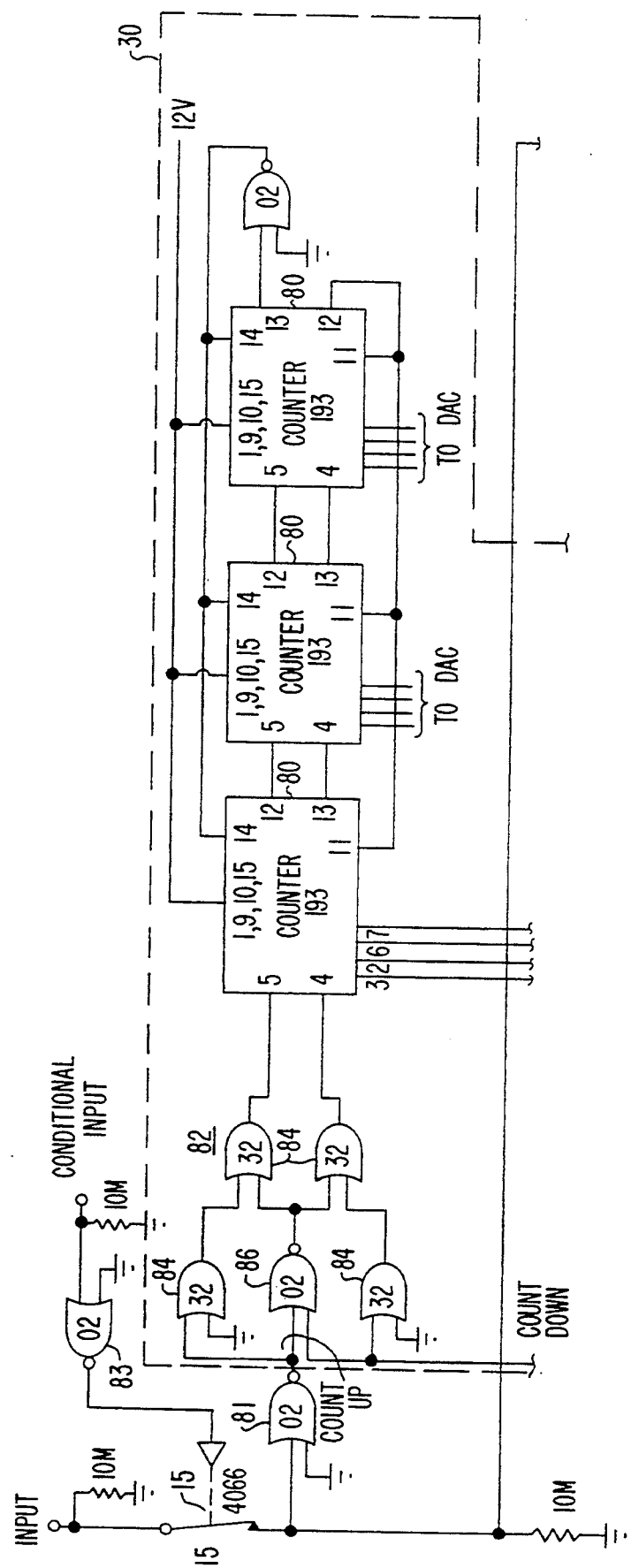
FIGS. 7 A and B are detailed circuit diagrams of a reverberant type of input stage.
Figure 7B:
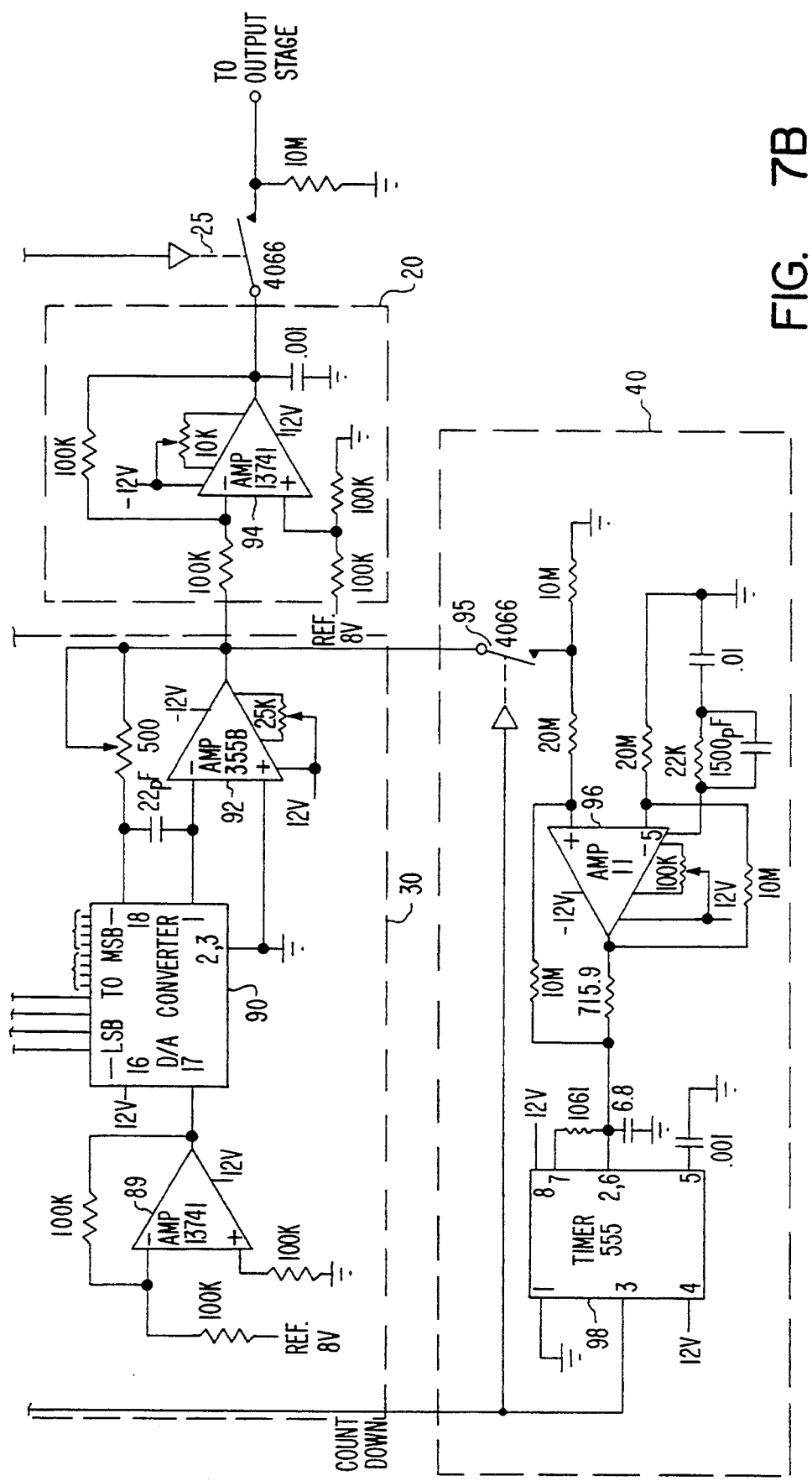
Figure 8:
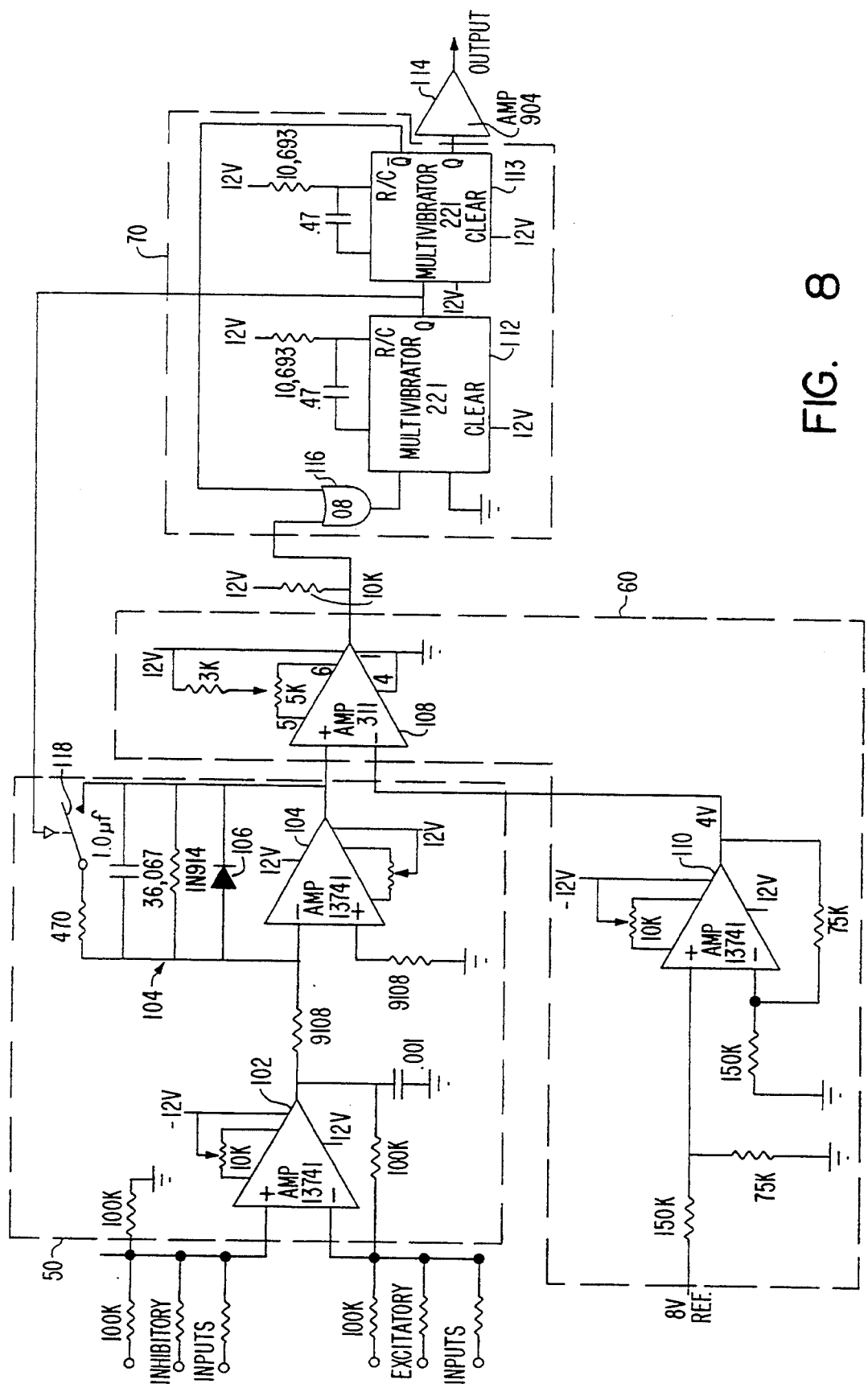
FIG. 8 is a detailed circuit diagram of an output stage with resetting capability.

The circuits of FIGS. 7 and 8 are designed with positive and negative 12 volt supplies, an 8 volt reference and a ground. Solid state devices are specified in accordance with National Semiconductor codes and values for an illustrative embodiment are indicated. Additional input circuits would connect to the output stage at the beginning of the output circuit for neurons with more than one input synapse.

The external input and the output signals are positive pulses of 12 volts amplitude. The pulses that occur between input and output stages are variable from 0 to 8 volts in amplitude, dependent upon synaptic weighting and prior experience, and essentially concurrent with the external input pulses during activity.

Referring now to FIGS. 7A and 7B, external input signals are applied via switch 15 (normally closed) to another switch 25 which releases the voltage from voltage regulating circuit 20 to the output stage. This voltage is generated by a digital-to-analog (D/A) converter 90 and operational amplifiers 92 and 94. The input signals are also inverted by a NOR gate 81 and applied to a filtering network 82 of OR gates 84 and NOR gates 86 to three four bit binary counters 80 having count-up and count-down inputs configured so that the counts will hold at maximum or minimum without wrap-around. The OR gates 84 and NOR gates 86 are utilized to prevent the counters from being confused by simultaneous opposing pulses. The count-up input receives an external input signal as previous described. The count-down input receives pulses from a voltage dependent pulse generator 40 whose frequency is directly related to the total on the counters 80. The counters' digital outputs feed the 12 bit D/A converter 90 whose output is fed to an operational amplifier 92 such that the output voltage of the D/A converter 90 is proportional to the total count in the counters 80. The reference voltage to the D/A converter 90 is illustrated as 8 volts via op amp 89. The voltage from op amp 92 is fed to both a differential amplifier 94 and the voltage dependent pulse generator 40. The differential amplifier 94 subtracts the voltage from the reference voltage of 8 volts or other voltage depending on the weighting of the input and therefore produces voltages inversely related to the original voltage.

The voltage dependent pulse generator 40 comprises an operational amplifier voltage-to-current converter 96 and a 555 timer 98 which feeds pulses through the filtering network 82 to the countdown input of the counters 80. The D/A converter 90 and op amp 92 voltage is separated from the voltage to current converter 96 by switch 95 during countdown pulses to avoid countdown pulses with variations which could compete unequally at the counters with possibly simultaneous count-up input pulses. The result produces a voltage at the differential amplifier 94 output which is continuously present, although variable, due to the action of the pulse generator 40 which constantly drives the counters 80 down at a rate related to that of the input's prior experience. A memory neuron input stage would have a summing up amplifier 94 instead of a differential amplifier which adds the voltage output of the D/A converter 90 and op amp 92 to zero or some other voltage. This voltage is applied to one side of a normally open analog switch 25 whose controlling input is the same standard external input signal as applied to the counters 80. The other side of the switch 25 feeds the output stage. Prior to the external input signal reaching the input stage circuit, the signal passes through switch 15 whose controlling input is a "conditional" second input inverted by NOR gate 83. The purpose is to simulate optional pre-synaptic inhibition of the synapse. The count-related voltage appears at the end of the circuitry only while an external input pulse is being received and if the conditional input is silent. The voltage magnitude is inversely related to the frequency with which that input circuitry has been activated in the past and has a pulse width essentially equal to the external signal pulse width.

Referring now to FIG. 8, a plurality of inhibitory inputs and excitatory inputs of various amplitudes from input stages such as that illustrated on FIG. 3 are applied to the recovering integrator 50. The recovering integrator 50 includes a differential amplifier 102 whose output is applied to the integrator 104. The output voltage of amplifier 102 may not be an accurate sum if multiple high amplitude inputs are driving the amplifier beyond its range limit. However, this will not generally occur or, at least would not be expected to produce more than maximal output frequency. The sum of the pulses from differential amplifier 102 are therefore fed to the integrator amplifier 104. The integrator amplifier 104 is reset to zero whenever an output pulse is generated. A diode 106 connected across the integrator 104 blocks negative phases such that inhibitory inputs only have an effect if excitatory inputs are also being received. The component values illustrated in FIG. 8 provide the desired time constants including the half life of natural postsynaptic potentials. The integrator 104 output is compared to a reference voltage acting as a threshold in a voltage comparator 108. The selected reference voltage is 4 volts obtained from an external 8 volt reference source via a reduction amplifier 110. The comparator 108 provides a signal to serially connected multivibrators 112 and 113 which when activated generate a fixed duration pulse which is coupled through a buffer amplifier 114 and constitutes the circuit output. The multivibrator 112 receives the signals through an AND gate 116 such that if resetting is not desired, the multivibrator triggers again immediately at the end of both cycles as long as the threshold on the integrator 104 remains exceeded. Multivibrator 112 resets the integrator 104 via switch 118. Dual multivibrators 112 and 113 are used so that the output of the circuit could be fed back to one of the input stages of the artificial neuron after the integrator 104 reset is released by multivibrator 112. Timing parameters for the multivibrators are shown as identical, however, the maximal output frequency of the output stage could be limited further by increasing the time interval on multivibrator 112. With resetting, stronger excitatory inputs will cause the integrator 104 to reach plus 4 volts again sooner and produce a higher output frequency.

The pulse width multivibrator 113 should be set such that it is the same for all neurons in the system. By using a very short pulse width for multivibrator 112, the maximal output frequency is limited only by the pulse width of multivibrator 113. If the first pulse width is longer, the output frequency can be limited further. These timing parameters form the "common language" between neurons and consistency within a system of such neurons is necessary to maintain memory balance. Of course, the integrator 50 sensitivity also will limit the output frequency if resetting is connected depending upon the degree of incoming stimulation.

Sensitivity of the recovering integrator 50 can be set to determine the amount of voltage accumulation progressing towards threshold for any single or multiple inputs. In this fashion, the neuron can be designed to fire anytime from immediately after a single input to only after many repeated or concurrent inputs. The selected reference voltage for the output stage controls the firing threshold.

Recovery half-life of the integrator 104 is determined by the time constant of the RC combination as shown. A long recovery will provide more opportunity for temporal summation, that is, the ability of rapid sequential inputs to accumulate integrator voltage. A short recovery half-life will minimize that possibility.

The resetting feature is optional and is used to simulate neurons whose action potential spreads throughout the soma of the neuron, thereby temporarily abolishing ongoing input activities. Resetting will cause the integrator 104 to start again from zero its accumulation of voltage after the neuron has fired, thereby retesting its collective inputs with a "relative refractoriness", and refiring more quickly to strong input stimulation. Neurons without resetting features will maintain a more continuous level of voltage on the integrator 104 despite neuron firing and generate repeating outputs if threshold remains exceeded. Lack of resetting will greatly enhance all effects of spatial and temporal summation when the output stage exceeds its threshold.

The timing parameters chosen in the presented circuit diagrams simulate biological neuron function as closely as possible. This was done out of respect for the evolutionary wisdom of nervous system activity. It is recognized, however, that biological constraints may have produced a compromise in these observed values. Electronic embodiments may allow these parameters to be optimized in other ways. In order to preserve this versatility, the input and output stages have been kept separate. A neuron of any desired configuration can be constructed with a combination of these input and output units.

It should be pointed out that the circuitry described is merely by way of example and that other circuits may be used to simulate the same effect as the input and output stages described. For example, integrated circuits may be used for all input and output stages for each category, class and subclass of neurons conceived. Commonly used types of neurons whose parameters are fixed fall in this category. Ultimately, integrated circuits containing a multitude of neurons having predetermined interconnections might be used to simulate neuron networks.

The present invention is thus directed to neuron simulation with adaptivity which is autonomous and driven automatically within each synapse rather than having fixed parameters which, after being set, do not vary unless the fixed parameters are manually changed or the total system response interpreted somehow. The use of separate input and output circuits present a plethora of possible combinations of inputs and output stages to simulate various types of neurons to be used in networks.

Since other changes and modifications vary to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

What I claim is:

1. An apparatus for artificial neurons simulating the functions of biological nerve cells comprising:
    at least one input stage having an input and an output for providing a function corresponding to an individual synapse and dendrite of a nerve cell;
    means for applying an input signal from a signal source to said input of said input stage;
    said input stage including a voltage regulating means for controlling the voltage amplitude of signals applied to said input of said input stage having a voltage dependency upon prior activity at said input over time without regard for total system responses and which automatically balances with said prior activity;
    means in said input stage coupled to said voltage regulating means for increasing the voltage amplitude of signals applied to said voltage regulating means in response to prior high signal frequency for simulating the function of a memory neuron;
    means in said input stage coupled to said voltage regulating means for decreasing the voltage amplitude of signals applied to said voltage regulating means in response to prior high signal frequency for simulating the function of a reverberation neuron; and.
    means in said input stage coupled to said voltage regulating means for assigning a predetermined weight in the form of a range of said voltage amplitude of said voltage regulating means for simulating the function of various dendrite anatomy of a nerve cell.

2. An artificial neuron for simulating the function of biological nerve cells comprising:
    an output stage for providing a function corresponding to the body of a nerve cell having excitory and inhibitory inputs applied thereto,
    wherein said output stage includes a recovering integrator means for integrating multiple excitory and inhibitory inputs simultaneously transmitted thereto with independent control of input sensitivity and recovery tendency;
    a threshold means in said output stage coupled to said recovering integrator means for simulating neurons having a predetermined stimulation level; and
    a pulse generator in said output stage comprising a pair of serially connected multivibrators, said pulse generator coupled to said threshold means for generating a single polarity fixed duration pulse output simulating the responsiveness of a neuron when activated by said threshold means.

3. The apparatus for artificial neurons in accordance with claim 1 having a conditional input coupled to said input of said input stage for altering the activation of a neuron when said conditional input is simultaneously applied and for simulating pre-synaptic inhibition.

4. An artificial neuron as claimed in claim 2 having an optional reset switch in said output stage coupled between said serially connected multivibrators and across said recovering integrator means for resetting said recovering integrator means to zero thereby eliminating prior stimuli and resetting the recovering integrator means to accumulate new stimuli for simulating certain neurophysiological functions of a nerve cell body.

5. An artificial neuron apparatus for simulating the functions of various individual biological nerve cells comprising:
- a plurality of excitatory inputs;
- a plurality of inhibitory inputs;
- a plurality of voltage regulator circuits for providing a regulated output therefrom each having one of said plurality of excitatory and inhibitory inputs applied thereto,
- where a neuron is identified by the number of inhibitory and excitatory inputs being applied to said voltage regulator circuits;
- an output circuit having an input for receiving said regulated outputs from said plurality of said voltage regulator circuits;
- threshold means in said output circuit for generating an output signal when the stimuli in said neuron exceeds a predetermined level;
- means in said output circuit coupled to said threshold means for stimulating towards threshold detection when excitatory inputs are applied to said voltage regulator circuits; and
- means in said output circuit coupled to said threshold means for impairing stimulation towards threshold detection when inhibitory inputs are applied to said voltage regulator circuits.

6. The artificial neuron apparatus as claimed in claim 5 having means coupled to said input of said output circuit for resetting said output circuit when the output signal reaches a predetermined level.

7. The artificial neuron apparatus as claimed in claim 5 having a conditional input signal means coupled to said input of said output circuit for applying a conditional input simultaneously with said regulated output for simulating pre-synaptic inhibition of the synapse of an individual biological nerve cell.

* * * * *